United States Patent
Pöting

[11] Patent Number: 5,823,011
[45] Date of Patent: Oct. 20, 1998

[54] APPARATUS FOR PRESS MOLDING GLASS BODIES

[75] Inventor: Klaus Pöting, Erkrath, Germany

[73] Assignee: Poting GmbH & Co. KG, Germany

[21] Appl. No.: 750,698

[22] PCT Filed: Mar. 21, 1995

[86] PCT No.: PCT/DE95/00381

§ 371 Date: Dec. 6, 1996

§ 102(e) Date: Dec. 6, 1996

[87] PCT Pub. No.: WO96/00193

PCT Pub. Date: Jan. 4, 1996

[30] Foreign Application Priority Data

Jun. 27, 1994 [DE] Germany .......................... 44 22 053.7

[51] Int. Cl.⁶ .............................. C03B 11/00; C03B 11/16
[52] U.S. Cl. ..................................... 65/305; 65/68; 65/85; 65/226; 65/308; 65/318; 65/321; 65/322; 65/362
[58] Field of Search .................................. 65/85, 83, 111, 65/215, 223, 226, 305, 306, 315, 321, 308, 348, 362, 314, 318, 322, 64, 68

[56] References Cited

U.S. PATENT DOCUMENTS

| | | |
|---|---|---|
| 653,523 | 7/1900 | O'Neill ...................................... 65/362 |
| 799,332 | 9/1905 | Hartman .................................... 65/362 |
| 1,340,366 | 5/1920 | Bingham . |
| 1,560,062 | 11/1925 | Kucera . |
| 1,590,481 | 6/1926 | Stenhouse et al. ........................ 65/305 |
| 1,611,363 | 12/1926 | O'Neill ...................................... 65/305 |
| 1,655,917 | 1/1928 | Obiol ........................................ 65/305 |
| 1,843,175 | 2/1932 | Sears . |
| 1,909,778 | 5/1933 | Marsden . |
| 2,053,402 | 9/1936 | Le Mare . |
| 2,244,809 | 6/1941 | Sloan . |
| 2,490,450 | 12/1949 | Lysle et al. . |
| 2,598,564 | 5/1952 | Kucera . |
| 2,783,591 | 3/1957 | Johnson . |
| 3,224,497 | 12/1965 | Copeland . |
| 3,291,588 | 12/1966 | Lippmann et al. ......................... 65/85 |
| 3,337,325 | 8/1967 | Bittner et al. . |
| 3,471,281 | 10/1969 | Bittner et al. . |
| 3,582,303 | 6/1971 | Stutske . |
| 3,595,637 | 7/1971 | Eldred et al. ............................. 65/362 |
| 4,094,657 | 6/1978 | Carmi et al. ............................... 65/83 |
| 4,459,147 | 7/1984 | Messina et al. .......................... 65/362 |

FOREIGN PATENT DOCUMENTS 28 32 067 B2   8/1980   Germany .

OTHER PUBLICATIONS

International Search Report For PCT/DE95/00381, dated Jul. 26, 1995.
International Preliminary Exam Report For PCT/DE95/00381, dated Sep. 4, 1996.
Article from *Sprechsaal*, vol. 123, No. 9, 1990, p. 885.

*Primary Examiner*—Steven P. Griffin
*Attorney, Agent, or Firm*—Vickers, Daniels & Young

[57] ABSTRACT

In the press-molding method for producing molded glass bodies, the molding plug remains in contact with the molded glass body in the mold after the molding process until the regions close to the surface have cooled to a temperature at which the molded body at least temporarily possesses sufficient inherent stability to be removed from the mold. To prevent re-heating of the regions near the surface from causing undesirable deformation of the molded glass body, the body is transferred to a cooling station after being removed from the press mold. With this method, the waiting period during which the molded glass body is in the mold is minimized, so this mold is available for another molding process after a very short time. The capability of a glass-molding apparatus operated according to the method of the invention is thus increased. The invention further relates to a glass-molding apparatus specifically suited for use according to this method, in which the drive of the molding plug occurs from a cam disk driven via an electric motor with controllable torque and speed.

5 Claims, 4 Drawing Sheets

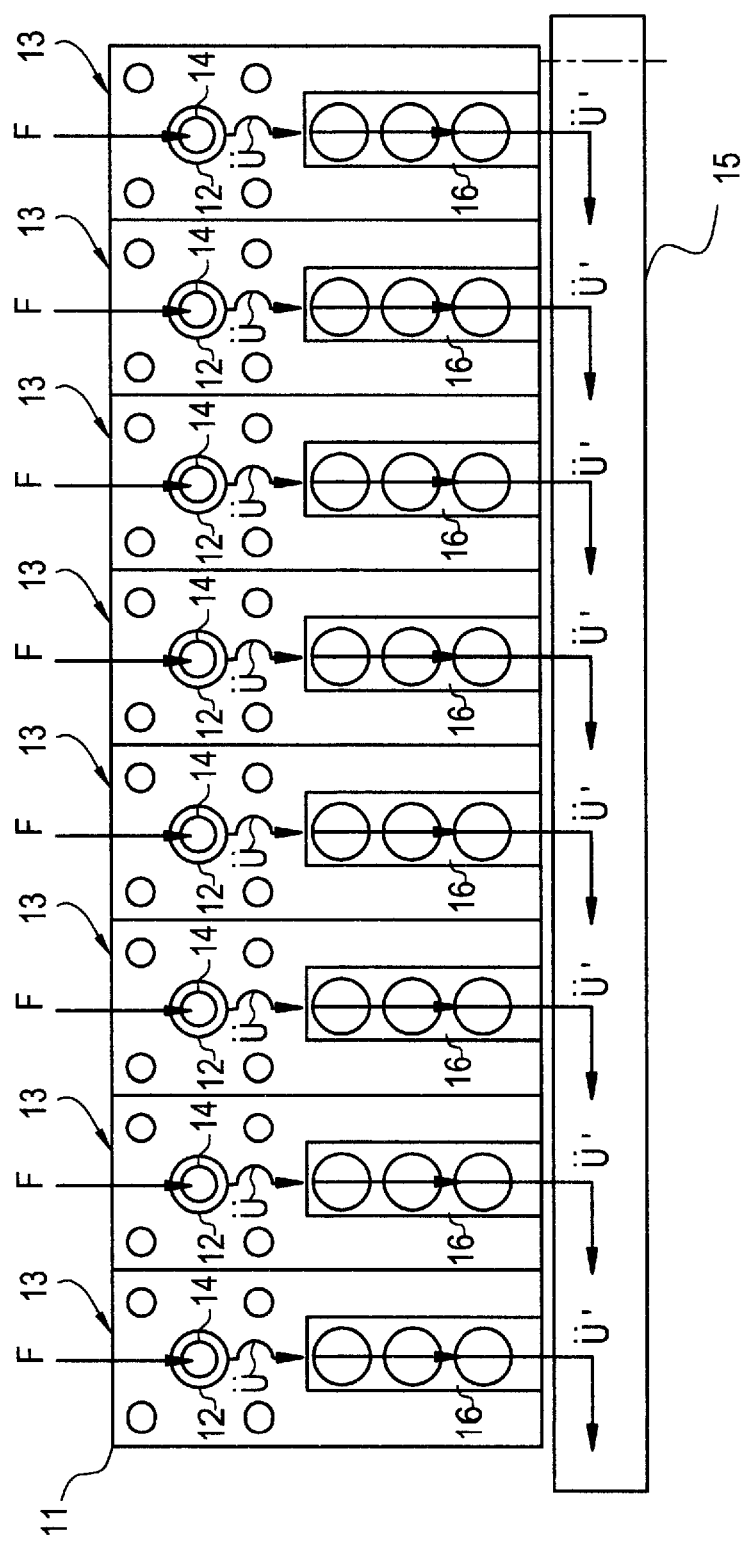

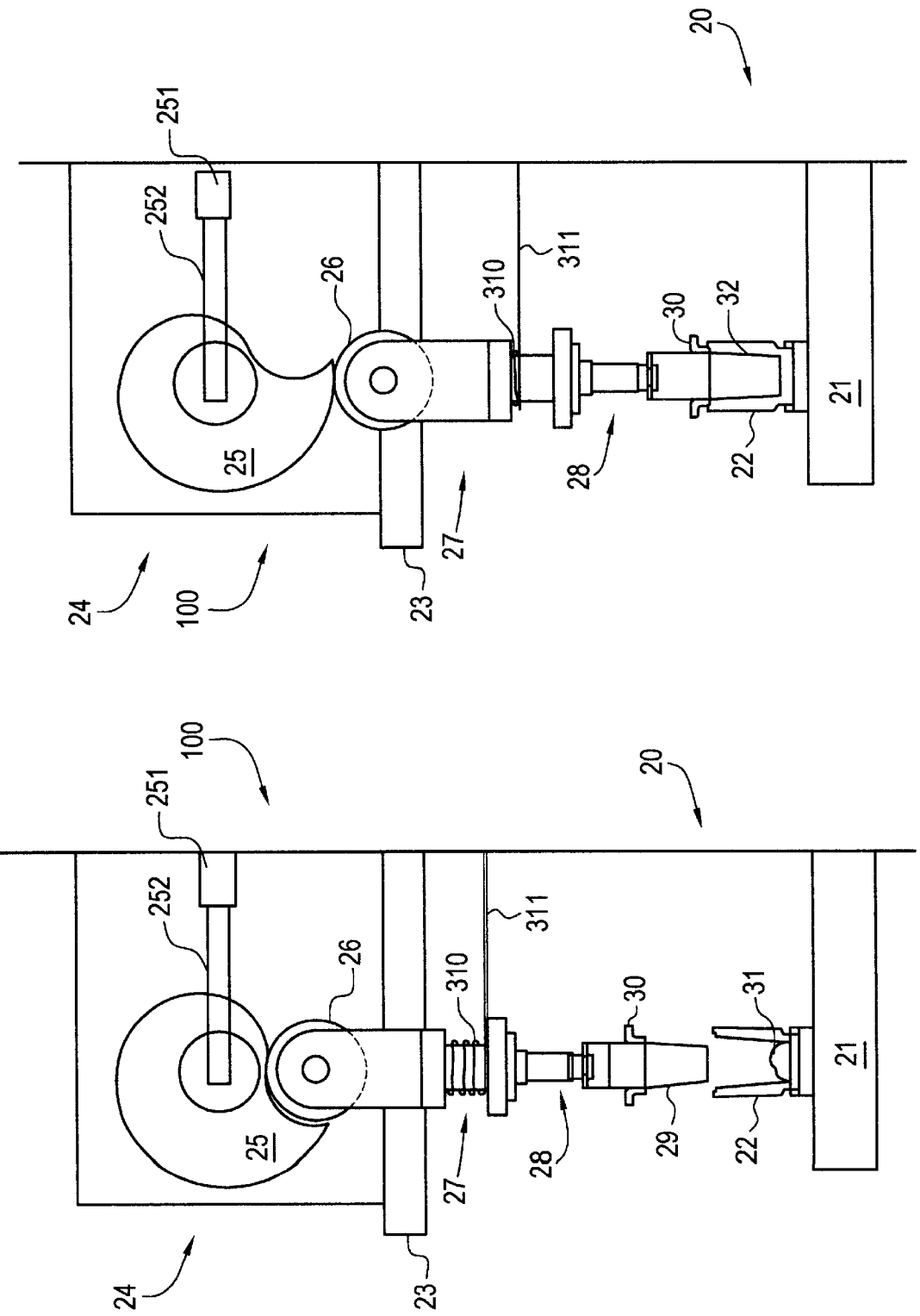

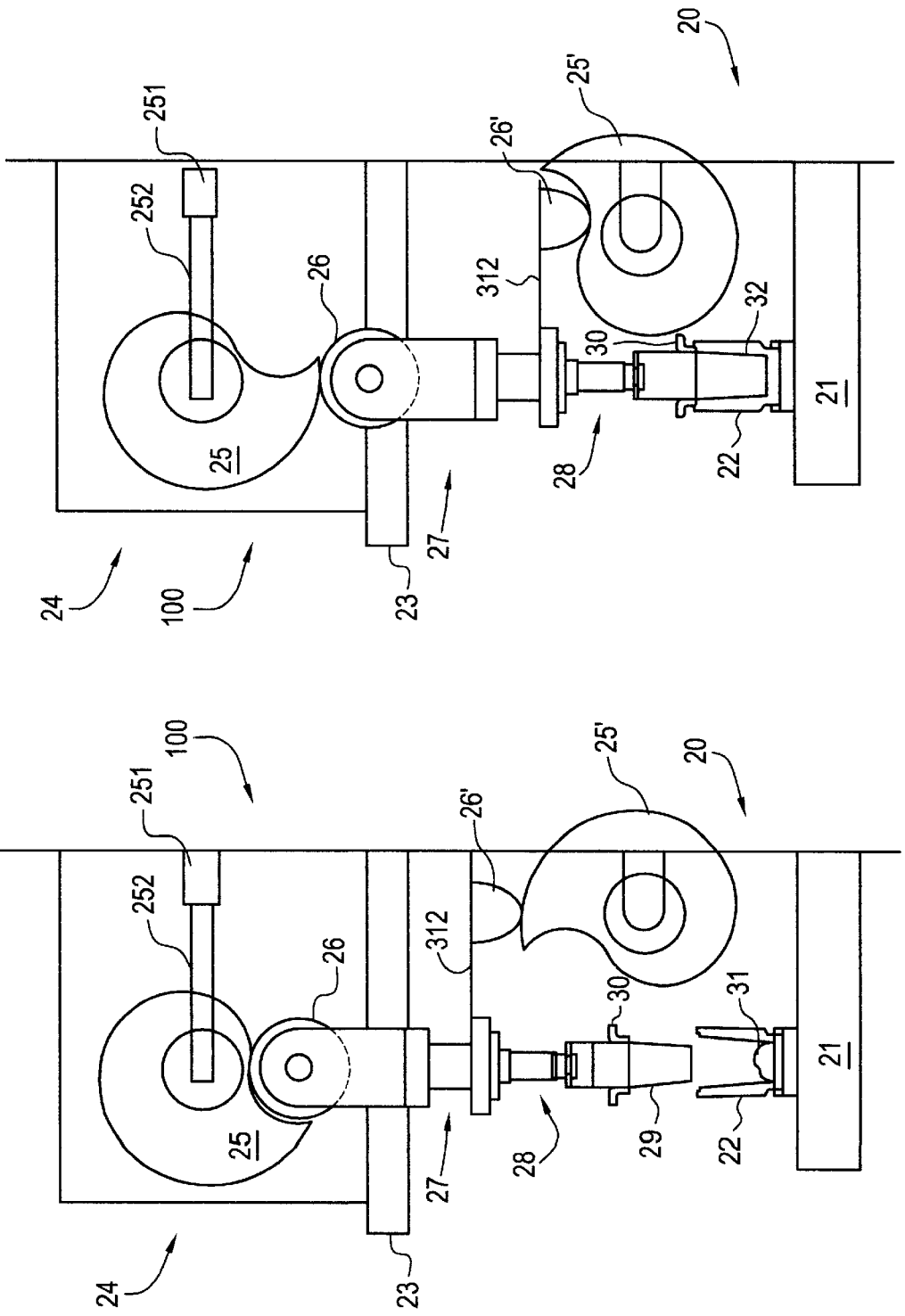

APPARATUS FOR PRESS MOLDING GLASS BODIES

The invention relates to a method of producing molded glass bodies in accordance with a press molding method, in which molten glass is pressed into a mold with the specified external shape. A molding plug, that determines the internal shape of the molded glass body, is used to press the molten glass at a pressing station. An apparatus particularly suited for executing this method, a glass molding apparatus for producing molded glass bodies using a press molding method.

BACKGROUND OF THE INVENTION

Generally, the methods used for molding glass bodies are those which involve a plurality of press molds disposed with constant angular spacing on a rotatable machine table. After the press mold that is located under a filling apparatus, the so-called feeder, has been filled with a predetermined quantity of molten glass, the table is turned by the angular distance of two adjacent press molds, so that the one now containing the molten glass is positioned under a molding plug. The molding plug, which determines the interior shape of the molded glass body, is lowered into the mold and presses the molten glass into its actual exterior shape. During this procedure, the adjacent mold, which is now located under the feeder, is filled with molten glass. After the minimum time required to complete the forming of the glass body, which is usually in a range of a few seconds, the molding plug is withdrawn from the mold, the machine table is rotated again by the angular distance of two adjacent molds, and the cycle starts over.

The molded glass body remains in its press mold until it has cooled, through radiant emission and in particular through heat dissipation via the press mold, to the point at which it has solidified into a dimensionally-stable body. Typically, the time required for cooling significantly exceeds the pressing time for completing the molding procedure, so the molded glass body has to be cooled in the mold for the duration of several cycles. Therefore, the machine table must be equipped with at least enough molds that the time required for transport from the pressing station to an unmolding station at least corresponds to the time required for cooling. The formula for the cooling time $t_k$ is:

$$t_k = (z-1)t_p = zt_T,$$

where z is the number of cycles, $t_p$ is the pressing time and $t_T$ is the time the rotating table requires to turn by an angular distance corresponding to the spacing between two adjacent molds. U.S. Pat. No. 3,337,325 discloses a glass-molding machine in which, following the actual forming process, the molding plug remains in the press mold, without considerable pressure, until the molded glass body has completely solidifies. Along with a device the covers the press mold during the solidification process, this measure prevents the formation of internal tension in the molded glass body. The capability of such methods, therefore, does not merely depend on the minimum pressing time required for molding the glass body, but is substantially limited by the time required to cool the molded glass body until it solidifies.

Hence, a significant disadvantage these methods is that the capability of the methods cannot be increased significantly, even with the use of more expensive and more efficient pressing drives, which allow for faster molding of the glass body.

Generally, for lowering the molding plug into the mold, apparatuses are used in which the plug is attached to the front end of a pressing rod, which can be acted upon by the force of a pressure cylinder. The molding plug is either pushed into the mold until the entire volume remaining between the plug and the mold has been filled with molten glass (so-called "stop-free pressing") or until the mold and the plug are in a position clearly defined by contact with a stop ("press to stop") at the end of the pressing process. Usually the pressure cylinder is hydraulically operated.

The disadvantage of this hydraulic drive is that the hydraulic assembly required to control the pressure in the hydraulic cylinder is made relatively complicated by a number of necessary control valves, hydraulic lines, pressure pumps, etc., and is therefore expensive to produce, and—particularly due to the high temperatures involved in glass processing—needs intensive maintenance.

SUMMARY OF THE INVENTION

It is an object of the invention to develop a method with which the capability of a glass-molding machine is increased without necessitating a significantly increased outlay for machinery. It is another object of the invention to create a glass-molding apparatus which is particularly suited for executing the method.

These objects are accomplished by the method of producing molded glass bodies in accordance with the present invention and the glass molding apparatus disclosed in Applicant's invention.

Since the molding plug remains in contact with the molded glass body in the press mold following the actual molding process, the contact with the metal molding plug allows an intensive heat transfer from the inside of the molded glass body to the plug, in addition to the heat which is dissipated from the outside of the molded glass body via the mold. Thus, in comparison to conventional methods, in which cooling air is often injected into the interior of the molded glass body, the molding plug effects a significantly more effective cooling of the inside of the molded glass body. This implies a significant reduction of the time span over which the molded body must remain in the mold, until at least the regions close to the surface have cooled to a temperature at which the molded body possesses sufficient inherent stability to be removed from the mold and transferred to a cooling station, which prevents the occurrence of deformation of the molded glass body due to reheating above the solidification temperature of the glass used. After a short time, the mold is therefore ready to be used in another pressing process.

In an especially advantageous embodiment in the cooling station, the molded glass bodies are transferred into a cooling mold that further decreases its temperature and evens it out. This measure can, on the one hand, help avoid undesirable deformation of the molded glass body due to partial heating above the solidification temperature of the glass used. On the other hand, the homogenization to one temperature due to use of the cooling mold effectively counteracts the development of inner tensions, especially in a molded glass body, whose shape stipulates great differences in its material strength. A "springing" of the molded glass body, i.e., sudden crack formation after complete cooling, can be completely eliminated in practice with this measure.

The capability of the method according to the invention can be greatly increased if, molded glass bodies are pressed concurrently frommolten glass in a plurality of press molds having a corresponding number of molding plugs, and transferred to the cooling station. Compared to conventional press-molding methods, the extra structural outlay is relatively low, consisting only of the additional molding plugs required. This means that, as compared to a method employing the same number of press molds, the effectiveness is increased due to the overall shorter time spent in the mold. The initial extra structural outlay for the additional molding plugs required for the application of the advantageous embodiment of the method of the invention is reduced in comparison to their use in conventional press methods due to their greatly increased service life, because they themselves are cooled during the cooling phase of the molded glass bodies, and are thus subjected to less thermal stress.

A glass-molding apparatus that is particularly suited for executing the method of the invention is also disclosed. It is nevertheless possible to use this glass-molding apparatus advantageously in the execution of conventional methods. Because the power generator with which the molding plug can be pressed into the mold after a preset time as a function of power and force is designed as a cam disk driven by an electric motor with torque and speed control, the molding plug can be pressed in faster and with greater precision than in conventional, hydraulically-driven power generators. The power generator in the glass-molding apparatus of the invention is also distinguished by low maintenance costs and the fact that it can be produced inexpensively. The noise level is also low during operation.

Because the torque and speed of the electric motor driving the cam disk can be controlled, the feed used to press the molding plug into the press mold and the force exerted on the molded glass body during the molding process can be easily adapted to the preset requirements of the molded glass body used. Thus, if necessary, a "pressing force program" can be carried out through variation of the current with which the electric motor is operated, i.e., the pressing force can be varied during the pressing process.

Through the selection of a correspondingly-shaped cam disk, the speed gradient of the force during the lowering of the plug can be pre-selected mechanically so that it can be adapted to match the individual requirements of the respective molded glass body or the glass material used.

In a preferred embodiment, the electric motor is a three-phase servomotor, because this allows for particularly sensitive control of its speed and the torque it generates.

The glass-molding apparatus advantageously effects the fastest, most precise and lowest-maintenance power transmission if, it includes a pressing rod that is guided to be displaceable in its axial direction and supports the molding plug at one end, and against the other end of which the cam disk acts.

Precise withdrawal of the molding plug from the mold is assured if, a countercam disk is used to pull out the molding plug.

Tests have shown that especially good pressing results are obtained when the device for withdrawing the molding plug is an elastic element that acts with force upon the molding plug counter to the pressing direction. It is, however, also possible to pull out the molding plug with the help of a hydraulically-driven or pneumatically-driven cylinder, a countercam disk or a counterweight.

The elastic element requires little maintenance and is inexpensive to produce when it includes at least one coil spring.

BRIEF DESCRIPTION OF THE DRAWINGS

The drawing figure shows a schematic representation of the method according to the invention in comparison to a conventional glass-molding method, as well as a glass-molding apparatus suitable for executing the method according to the invention. Shown are in:

FIG. 2 a representation of the method according to the invention employing a linear eight-mold table and eight molding plugs;

FIG. 3 a side view, with the molding plug removed from the press mold, of an embodiment of the glass-molding apparatus of the invention, which is particularly suitable for executing the method according to the invention;

FIG. 4 the same device in FIG. 3 the same view during a pressing process;

FIG. 5 is a side view identical to FIG. 3 except that an elastic countering element has been replaced by a counter-cam disk; and FIG. 6 is the same device shown in FIG. 5 during a pressing process.

DETAILED DESCRIPTION OF THE INVENTION

Figure 1:
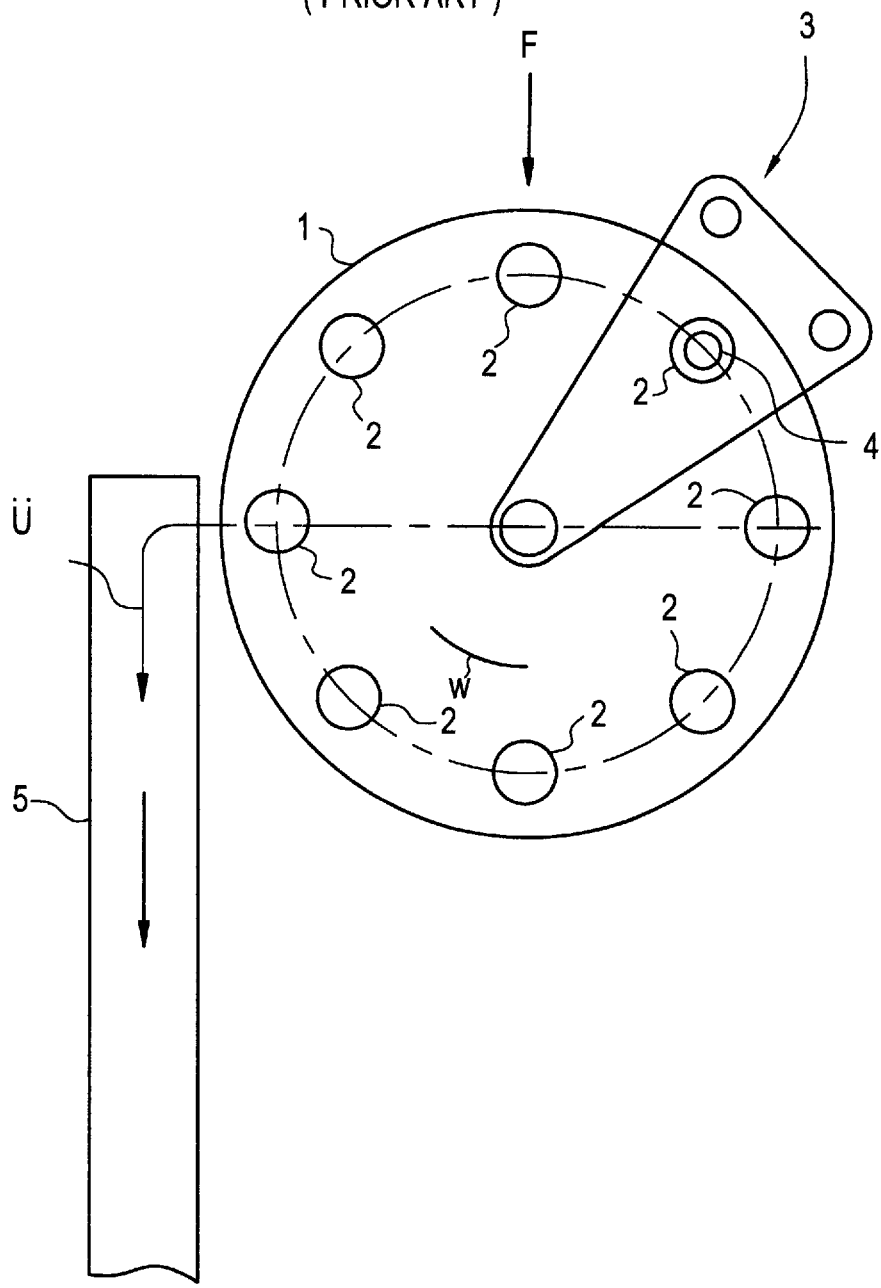
FIG. 1 the sequence over time of a conventional, multiple-station glass-molding method employing a molding plug and a rotating eight-mold machine table.

Hereinafter "above" and "below" refer to the upright operation of the glass-molding apparatus represented in FIG. 3 through 6.

A rotating machine table 1, which includes eight press molds 2, is used to execute the conventional method shown in FIG. 1. The angular spacing w between the adjacent molds 2 is 45°.

In the first step of producing a molded glass body, a preset quantity of molten glass is poured into one of the molds with the help of a feeder, not shown in the drawing. This filling procedure is represented by an arrow marked F in FIG. 1. After completion of the filling procedure F, the machine table is rotated clockwise by the angular distance w, so the previously filled mold 2 is positioned in a glass-molding apparatus 3, only indicated in FIG. 1, such that the molding plug 4 is pressed into the mold 2 and forms the glass body, which cannot be seen in the drawing. During the molding process, the next mold 2—when seen in the direction of rotation of the machine table 1—is located under the feeder and is filled with molten glass during the filling process F. After the required pressing time $t_p$ for full formation of the glass body, which—depending on the molded glass body and glass material used—is in a range of a few seconds, the molding plug 4 is withdrawn from the mold 2 and the machine table 1 is again rotated clockwise by the angular distance w, positioning the mold 2 filled with molten glass under the pressing rod.

To cool the previously-molded glass body until it has completely solidified, in the example in FIG. 1 for a conventional glass-molding method, the body remains in the mold 2 for four additional cycles before the transfer Ü to a transport belt 5 is effected.

The following example is intended for calculating the capability of this conventional method employing an eight-mold machine table and a stamp-pressing device. The pressing time $t_p$ of 2 seconds used in the following example is realistic for a molded glass body having a wall thickness of 10 mm. As explained at the outset, the following formula applies for the cooling time $t_k$:

$$t_k = (z-1)t_p + zt_T,$$

where z is the number of cycles, $t_p$ is the pressing time and $t_T$ is the time required to rotate the table by the distance of the angular spacing between adjacent molds. For the sake of simplicity, it is assumed that $t_T=1$ second. This then results in a cooling time $t_k$ of 13 seconds for a molded glass body in the present example. Combined with the pressing time $t_p=2$ seconds necessary to shape the molded glass body, a time of 15 seconds elapses from the beginning of the pressing process to the transfer of the molded body to the transport belt. In the method providing the basis for this calculation, five angular rotations of the machine table occur after the actual pressing process until the molded glass body is transferred to the transport line; consequently, five molded glass bodies are in the machine table molds at one time. In total, 20 molded glass bodies are produced per minute.

Corresponding to FIG. 1, FIG. 2 illustrates the sequence of the method of the invention using as an example an apparatus that includes a linear machine table 11 having eight press molds 12, as well as a glass-molding apparatus 13 that has eight molding plugs 14.

In the method of the invention, the filling F of the proportioned quantity of molten glass into the molds 12 is effected before the molds are conveyed and transferred to the machine table 11 by a device not shown in the figure. After the transfer, the eight molding plugs 14 are pressed into the molds 12 at the same time, and remain in contact with the glass body in the mold until the areas near the body surface have cooled to a temperature at which the molded glass body possesses sufficient inherent stability to be removed from the mold and transferred to a cooling station. For a molded body in accordance with the example explained in conjunction with FIG. 1, the body having a glass wall thickness of 10 mm, the time necessary for this cooling process is only 7 seconds due to the additional heat dissipation via the molding plug. After this pressing time $t_p$, which includes the cooling time $t_k$, the transfer Ü of the molded body to a cooling station 16 is effected; the cooling station can simply comprise a cold-air fan, or can include cooling molds, not shown in the drawing, that further lower and even out the temperature of the molded glass body. In the cooling station, the molded glass body is cooled until it has completely solidified. It is then transferred to a transport belt 15 in an additional transfer step Ü'.

Hereinafter the capability of this method will be determined based on an example explained in conjunction with FIG. 2. As already mentioned, the pressing time and cooling time $t_p$ and $t_k$, respectively, is 7 seconds, which corresponds to the total time the body is in the corresponding mold 12. Analogously to the method explained in conjunction with FIG. 1, the transport time for the transfer Ü of the molded glass body to the cooling station should be 1 second. In total, according to the method of the invention, 8 seconds elapse before a mold is available for a new filling F of a proportioned quantity of molten glass. Therefore, an average of 7.5 molded glass bodies can be produced per minute with each mold, which results in a total of 60 molded glass bodies per minute with the use of eight molds and eight molding plugs.

The comparison of these two methods clearly shows the higher capability that is attainable using the method according to the invention and the same number of molds.

A glass-molding apparatus that is particularly suitable for executing the method according of the invention is explained below in conjunction with FIGS. 3 through 6.

The glass-molding apparatus 100 comprises a frame 20, which is not represented in detail in the drawing and from which a press bed 21 protrudes, the surface of which lies in a horizontal plane. The press bed 21 supports a press mold 22 on its upper side. Above the press bed 21, a fixed bracket 23 that supports the press drive 24 on its upper side is mounted to the frame 20.

The press drive 24 comprises a cam disk 25 driven by a three-phase servomotor 251 and a gearbox 252 and acts on a roller 26 attached to the upper end of a pressing rod 27 seated to be displaceable in the direction of its lengthwise axis in the bracket 23. The pressing rod 27 has a quick-change attachment 28 at its lower end, by means of which a molding plug 29 forming the counterpart for the relevant mold 22 can be secured to the pressing rod 27. Provided in the upper area of the molding plug 29 is a radially-overhanging ring 30 that forms the stop during "press to stop," so that the remaining available volume between the inner surface of the mold 22 and the outer surface of the molding plug 29, into which a quantity of molten glass 31 located in the mold 22 is pressed and which determines the shape and wall thickness of the molded glass body 32, is clearly specified.

Generally, the proportioned quantity of glass supplied to a mold 22 via the feeder varies too drastically for executing the "press to stop" method, so the differences in quantity, which lead to slight differences in the wall thickness of the molded glass bodies, must be balanced out during the pressing process. The pressing process is then conducted according to the method of "stop-free pressing," at a specified press pressure, i.e., the cam disk 25 presses the molding plug 29 into the mold 22 with a predeterminable final force.

In FIG. 3 the glass-molding apparatus is illustrated in an operating state prior to the pressing of the molded glass bodies. As is illustrated in FIG. 4, the cam disk 25 is rotated clockwise with the aid of a three-phase servomotor, whereby the eccentricity of the cam disk displaces the pressing rod 27 downward, and thus presses the molding plug 29 into the mold 22 until the ring 30 stops on the upper side of the mold 22. During this pressing process, the molten glass enters the space remaining between the molding plug and the mold 22 and forms the molded glass body 32 after solidifying. Following completion of the pressing process, the molding plug 29 is withdrawn from the mold 22 once the cam disk 25 has been rotated further to its initial position. This device can comprise an elastic element, a counterweight, a hydraulically-driven or pneumatically-driven cylinder or a countercam disk.

An elastic element or coil spring 310 is shown in FIGS. 3 and 4. Coil spring 310 counteracts with cam disk 25 to withdraw molding plug after a completed molding process. It will be appreciated that bracket 311 is fixedly mounted to frame 20 and slidably engages with pressing rod 27. Coil spring 310 is placed about pressing rod 27 such that when pressing rod 27 is axially moved downward into mold 22, coil spring 310 is compressed against bracket 311, as shown in FIG. 4. As cam disk 25 is rotated out of engagement with roller 26, coil spring 310 axially expands to elastically lift pressing rod 27 from mold 22.

FIGS. 5 and 6 differ from FIGS. 3 and 4 only in that coil spring 310 has been replaced by a counter disk 25', a bracket 312 and a roller 26'. In the embodiments of FIGS. 5 and 6, bracket 312 is attached to pressing rod 27 and a roller 26' is fixedly attached to bracket 312, neither being supported on frame 20. Countercam disk 25' is supported on frame 20 and, as shown in FIG. 6, can be actuated to mechanically push pressing rod 27 out of mold 22, in an action that directly mirrors that of cam disk 25 which engages and pushes pressing rod 27 into mold 22 as described above. It will be further appreciated that cam disk 25 includes a three-phase servomotor 251 and a gearbox 252 for operation. Counter-cam disk 25' can be operated by a three-phase servomotor (not shown), like cam disk 25.

It is claimed:

1. Glass-molding apparatus for producing molded glass bodies using a press-molding method, said apparatus comprising at least one pressing station which includes a press mold and a molding plug, said press mold determines a specified external shape of the molded glass bodies and into which a proportioned amount of molten glass is poured and pressed by said molding plug that determines a specified internal shape of the molded glass bodies, the apparatus further including a power generator which presses the molding plug into the mold, the apparatus further including a device for withdrawing the molding plug after a completed molding process, the power generator including an electric motor having torque and speed control and further including a cam disk, said electric motor driving said cam disk, an axially extending pressing rod being provided which supports the molding plug at a first end and is guided to be displaceable in an axial direction, said cam disk acting against a second end of said pressing rod.

2. Apparatus as defined in claim 1, wherein said electric motor is a three-phase servomotor.

3. Apparatus as defined in claim 1, wherein the device for withdrawing the molding plug is a countercam disk that acts on the pressing rod.

4. Apparatus as defined in claim 1, wherein the device for withdrawing the molding plug is an elastic element that acts with force upon the molding plug in an axial direction for withdrawing said molding plug.

5. Apparatus as defined in claim 4, wherein the elastic element includes at least one coil spring.

\* \* \* \* \*